June 18, 1963 F. BISZANTZ ETAL 3,094,359
HYDRAULIC SYSTEM FOR DUMP TRUCKS
Filed Jan. 7, 1960 4 Sheets-Sheet 2

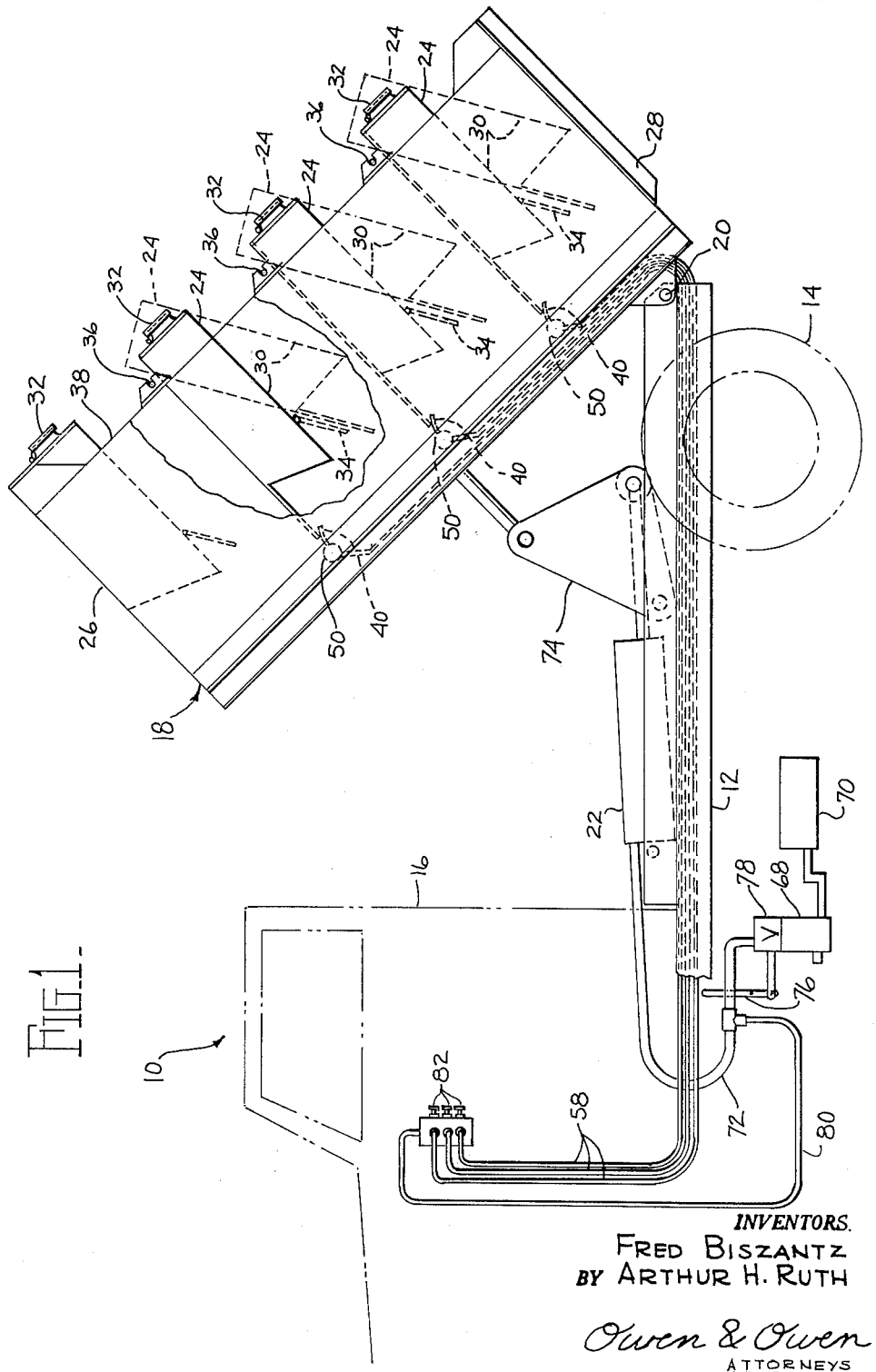

INVENTORS.
FRED BISZANTZ
BY ARTHUR H. RUTH

Owen & Owen
ATTORNEYS

June 18, 1963

F. BISZANTZ ETAL 3,094,359

HYDRAULIC SYSTEM FOR DUMP TRUCKS

Filed Jan. 7, 1960

INVENTORS.
FRED BISZANTZ
BY ARTHUR H. RUTH

Owen & Owen
ATTORNEYS

June 18, 1963  F. BISZANTZ ETAL  3,094,359
HYDRAULIC SYSTEM FOR DUMP TRUCKS
Filed Jan. 7, 1960  4 Sheets-Sheet 4

INVENTORS.
FRED BISZANTZ
BY ARTHUR H. RUTH

Owen & Owen
ATTORNEYS

United States Patent Office 3,094,359
Patented June 18, 1963

3,094,359
HYDRAULIC SYSTEM FOR DUMP TRUCKS
Fred Biszantz and Arthur H. Ruth, Galion, Ohio, assignors to Hercules Galion Products Inc., a corporation of Delaware
Filed Jan. 7, 1960, Ser. No. 1,123
2 Claims. (Cl. 298—8)

This invention relates to a hydraulic system for dump trucks and more particularly to a hydraulic system associated with partitioned dump truck bodies.

Partitioned dump truck bodies have recently received wide acceptance for various uses. For hauling batches of cement and aggregate to a mixer, partitioned bodies enable a number of batches to be hauled to the mixer at one time and individually processed therein. Otherwise, each batch must be transported singly from the source to the mixer, which is both more expensive and more time consuming, particularly when the capacity of the truck transporting the batch and aggregate exceeds the capacity of the mixer, as is frequently the case.

The present invention relates to an improved partitioned dump truck, and particularly to a hydraulic system for enabling the partitions to be opened and closed. In existing systems the hydraulic pressure for this operation is derived from a continuously operating pump or from separate accumulators. In the new hydraulic system, the hoist cylinder for the dump truck body is employed also as an accumulator to furnish hydraulic fluid under pressure for operation of the partition trip mechanisms. The new system enables separate accumulators to be eliminated, which accumulators consume considerable space, are expensive, and require additional piping and controls which also add to the cost and complexity of operation. With the new system, the partitions are easier to operate and do not require any particular skill in order to provide the proper timing, as was previously necessary.

It is, therefore, a principal object of the invention to provide an improved hydraulic system for dump trucks, which system is less expensive, consumes less space, and simplifies operation.

Another object of the invention is to provide a dump truck having a partitioned dump body and an improved hydraulic system for operating same.

Other objects and advantages of the invention will be apparent from the following detailed description of a preferred embodiment thereof, reference being made to the accompanying drawing, in which:

FIG. 1 is a schematic view in elevation, with parts broken away, of a dump truck according to the invention with a partitioned dump body and hydraulic system therefor;

Figure 4:
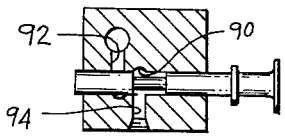
FIG. 4 is a view in cross section of the same valve in a closed position.

Referring to the drawings, and more particularly to FIG. 1, a dump truck indicated at 10 includes a chassis 12, wheels 14, a cab 16, a partitioned dump body 18 pivoted to the chassis at 20, and a hydraulic hoist 22. The partitioned dump body 18 includes three movable partitions or intermediate gates 24 (shown opened in dotted lines), a stationary end partition 26 and a tail gate 28. These divide the body 18 into four sections, each of which is capable of carrying enough batch to fill a cement mixer to capacity. Aggregate is held in each of the sections and the cement is held in containers 30 which in most instances form a part of the partitions 24. The containers 30 are filled through capped openings 32 at the tops thereof and the cement is discharged through lower doors 34 which are normally held closed by the weight of the adjacent aggregate.

The partitions 24 are pivoted at 36 to upper edges of side walls 38 forming the sides of the sections and tend to pivot toward open positions by gravity when the body 18 is raised. However, the partitions are held closed by latches or stops 40 so that when the body 18 is raised and the tail gate 28 is opened, only the batch in the first section and the first container 30 is discharged or dumped. After the first batch is processed and it is desired to discharge a second batch, the first of the partitions 24 is released whereby it swings open because of its own weight and discharges the batch in the second section and the second container 30. The other partitions are opened in sequence as additional batches are needed.

Figure 5:
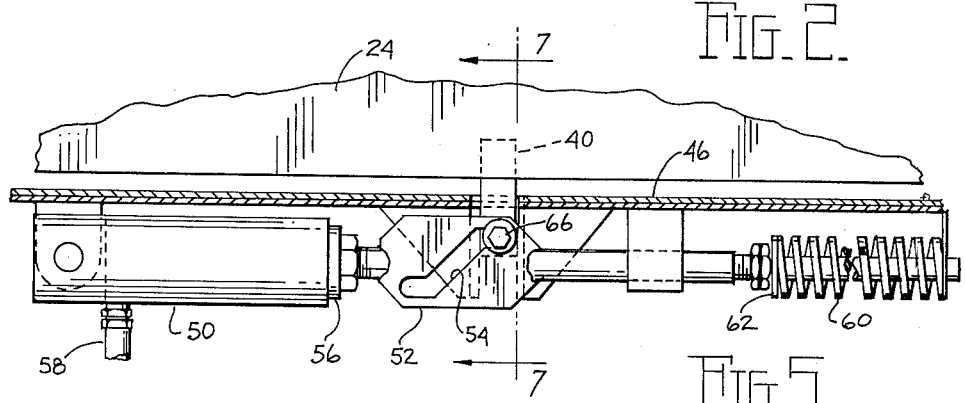
FIG. 5 is a fragmentary side view of a latch-operating mechanism for enabling partitions in the dump body to open, the latch being in a closed position.
Figure 6:
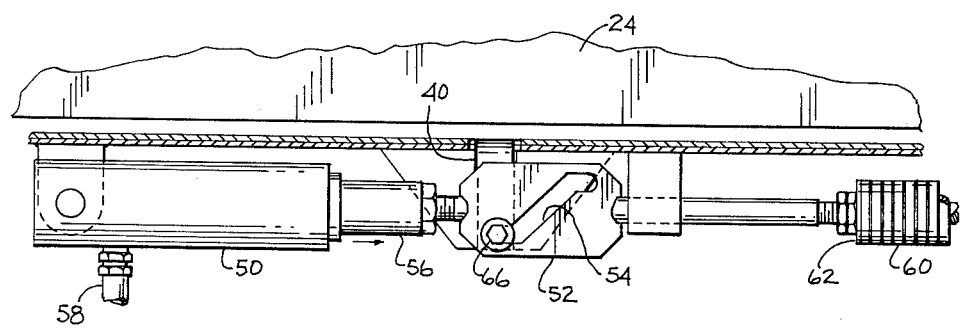
FIG. 6 is a view similar to FIG. 5, but with the latch in an open position.
Figure 7:
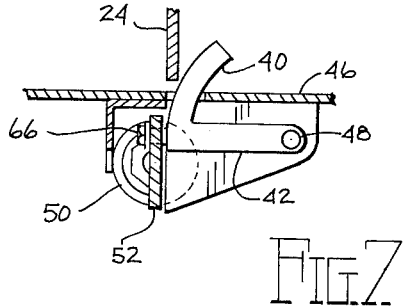
FIG. 7 is a view in cross section taken along the line 7—7 of FIG. 5.

The partitions can be released by any suitable linkage. One form of appropriate linkage may be constructed as shown in FIGS. 5–7, in which each of the stops 40 is supported at the end of an arm 42 (FIG. 7) and projects through an opening 44 in a bottom 46 of the body 18. The arm 42 is pivoted at 48 below the bottom 46 and is moved around the pivot 48 by means of an auxiliary ram 50. A plate 52 with a slanted slot 54 is attached to a rod 56 of the ram 50 and moves horizontally therewith, being moved toward the right in FIG. 6 when power fluid, such as air or hydraulic fluid, is supplied through a line 58, and being moved toward the left, when pressure of the hydraulic fluid in the line 58 is released, by means of a spring 60 which is compressed (FIG. 6) between a collar 62 and an ear 64 when the rod 56 is moved toward the right. A projection 66 of the arm 42 extends through the slanted slot 54 and moves up and down as the slot 54 is moved, carrying with it the arm 42. When the slot 54 and the plate 52 are at the left, as shown in FIG. 5, the projection 66, the arm 42, and the latch 40 are up, preventing movement of the partition 24. When the slot 54 and the plate 52 are at the right (FIG. 6), the projection 66, the arm 42, and the latch 40 are lowered, thus enabling the partition 24 associated therewith to swing freely.

Referring more particularly to the hydraulic control system, the hydraulic hoist 22 (FIG. 1) is supplied with hydraulic fluid from a pump 68, taking fluid from a tank 70 and supplying it to the cylinder 22 through a line 72. The pressure of the hydraulic fluid causes the hydraulic hoist 22 to raise the body 18 through a lever plate 74. The hoist 22 contains a considerable amount of oil which is under high pressure, while the body 18 remains in the raised position, due to the weight of the body. The lever 76 operates a hoist control valve 78 which controls the flow of hydraulic fluid to either end of the hydraulic hoist 22, as is well known in the art.

Figure 3:
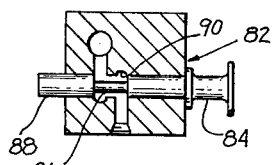
FIG. 3 is a view in cross section of one of the valves in an opened position.
Figure 2:
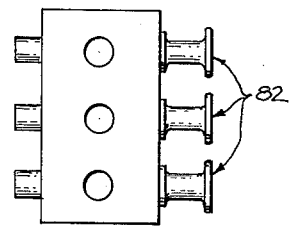
FIG. 2 is a side view of a plurality of control valves employed in the dump truck cab.

In accordance with the invention, an auxiliary hydraulic fluid line 80 is in communication with the hoist cylinder supply line 72 and is connected to the auxiliary rams 50 through the lines 58 and control valves 82 located in the cab 16 of the truck 10. The valves 82 can be of any suitable design and in the form shown are of the spool type, each having an operating knob 84 connected through a rod 86 to a spool 88 interposed in a cavity 90 between a passage 92, to which the line 80 is connected, and a passage 94 to which one of the branch lines 58 is connected. When the valve is in the position shown in FIG. 3, hydraulic fluid can flow at hoist cylinder pressure from the line 80 to the line 58 with which the respective valve 82 is associated and when the valve is in the position shown in FIG. 4, the passage 92 is blocked and the auxiliary ram 50 remains unactuated, with the plate 52 toward the left as shown in FIG. 6 and the stop 40 projecting upwardly as shown in FIG. 7.

In operation, when the dump 18 is raised, and there is hydraulic fluid under pressure in the hydraulic hoist 22, the first of the partitions 24 is released and opened, when desired, by pushing in the lower knob 84 for the lower valve 82. The hydraulic fluid under hoist cylinder pressure then communicates with the first auxiliary ram 50 for the first partition 24, causing the plate 52 and the rod 56 to move toward the right and causing the projections 66 and the arm 42 to move lower and to move the stop 40 with them. The first partition 24 then swings outwardly by gravity, discharging its batch, including the cement in the second container 30. The quantity of pressure fluid which is drained from the hoist to the auxiliary ram 50 is very small and makes no appreciable change in the position of the body. When desired, the intermediate knob 84 is pushed into open the intermediate valve 82 and supply power to the second auxiliary ram 50 to open the second partition 24. Finally, the top knob 84 is pushed to open the top valve 82 and release the third movable partition 24. The supply passage 94 is preferably arranged so that fluid will not be supplied to a particular ram 50 unless the previous valves 82 have been opened. Each time one of the valves 82 is opened, a small amount of fluid from the hoist 22 passes to one of the auxiliary rams 50. However, the hoist 22 has a very large supply of hydraulic fluid compared to the capacities of the rams 50 so that the body 18 will move downwardly only a very minute amount as each of the partitions 24 is released.

Upon completion of the dumping operation, the lever 76 is operated to move the main control valve 78 to enable hydraulic fluid from the blind end of the hoist 22 to drain back into the sump or tank 70 with the hydraulic pressure in the entire system decreasing as the body 18 is lowered. The ram rods 56 will then be urged toward the left as shown in FIG. 6 by means of the springs 60 and thus cause the stops 40 to again raise. To enable the partitions 24 to pass over the stops 40 and assume their locked positions with the dump body 18 in a horizontal position, the valves 82 are again individually opened briefly with the pump 68 running and the main control valve 78 placed in raised position by means of the lever 76 so that hydraulic fluid is again supplied to the auxiliary rams 50 so that the stops 40 are again momentarily lowered. The partitions 24 will then swing over them into their locked positions, and cannot reopen until the body 18 is tilted and the stops 40 are lowered again. This resetting operation can be done at any time during the trip from the mixer back to the charging station so that production is not held up or slowed down.

Figure 8:
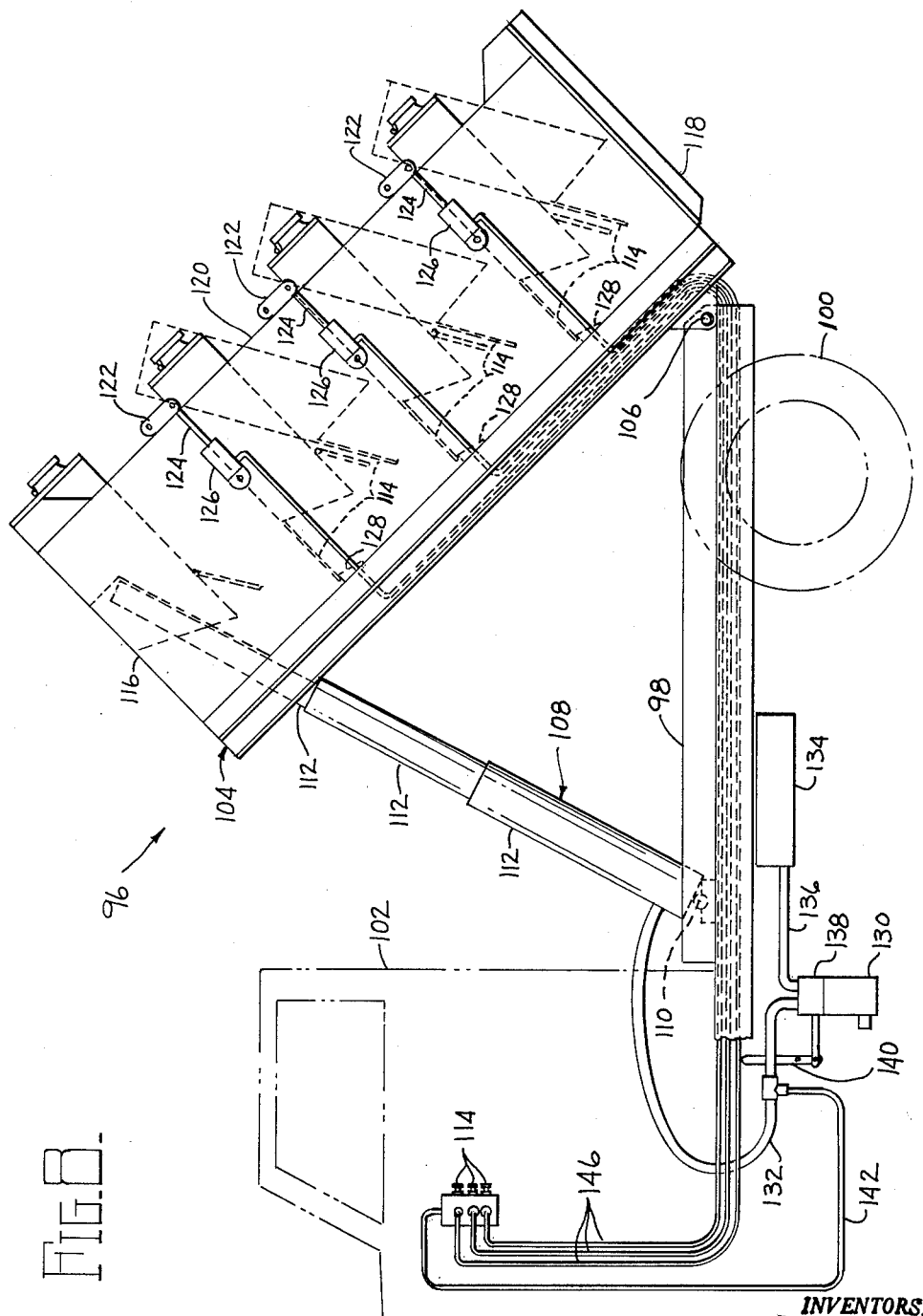
FIG. 8 is a schematic view in elevation of another dump truck according to the invention embodying a modified partitioned dump body and a hydraulic system therefor.
Figure 9:
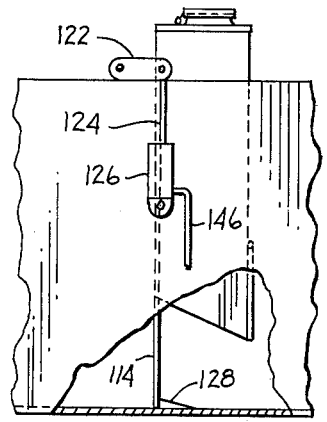
FIG. 9 is a detailed view, with parts broken away, of latch-operating mechanism for enabling the partitions to open, the partition being shown in a latched position.
Figure 10:
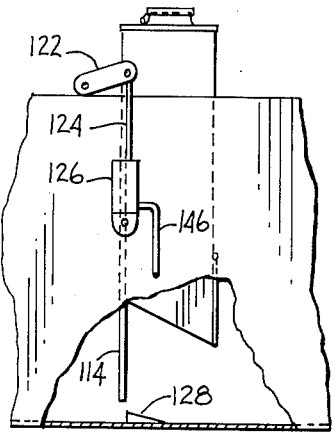
FIG. 10 is a view similar to FIG. 9, but with the partition in an unlatched position.

Referring more particularly to FIG. 8, a modified form of the invention is shown in connection with a truck 96 which includes a chassis 98, wheels 100, a cab 102, and a partitioned dump body 104. The body 104 is pivoted at 106 and is raised and lowered by a hoist 108 which is also pivoted to the chassis 98 at 110 and includes three telescoping sections 112, as is known in the art. The body 104 has three movable partitions or intermediate gates 114 which are similar to the partitions 24, a stationary end partition 116, and a tail gate 118. The partitions 114 are pivoted on one side to a top edge of one of side walls 120 and are pivotally attached to levers 122 on the other side. One end of each of the levers 122 is pivoted to the upper edge of the other side wall 120 and the other end is pivotally attached to a piston rod 124 of an auxiliary ram 126 mounted on the side wall 120. When hydraulic fluid is supplied to the auxiliary rams 126, they operate the linkage and move the rods 124 upwardly, thereby pivoting the levers 122 upwardly and raising the partitions 114. The lower edges of the partitions are thus raised above latches or stops 128 (FIG. 10) and enable the partitions 114 to be released and swing outwardly.

Hydraulic fluid is supplied to the hoist 108 from a pump 130 through a line 132, the fluid being taken from a tank 134 through a line 136. Flow is controlled by a hoist control valve 138 operated by a lever 140. A branch supply line 142 communicates with the cylinder 108 through the line 132 and is connected to partition control valves 144 which are similar to the valves 82. These valves are connected to auxiliary supply lines 146 for the auxiliary rams 126. The hydraulic fluid at the required pressure for the rams 126 is supplied from the hoist 108 in the same manner as the auxiliary rams 50 are supplied by the hoist 22. Again, the capacity of the hoist 108 is much greater than that of the rams 126 so that the dump body 104 is lowered almost imperceptibly when fluid is taken from the hoist to the rams 126.

Various modifications of the above described embodiments of the invention will be apparent to those skilled in the art. It is to be understood that such modifications can be employed without departing from the scope of the invention, if within the spirit and tenor of the appended claims.

What I claim is:

1. A dump truck having a partitioned dump truck body and a hydraulic system therefor, said truck and system comprising a partition in said dump truck body pivoted thereto for free swinging movement with respect thereto, means for releasably holding said partition in a predetermined position laterally of said body, linkage means for releasing said partition from said holding means, a main hoist for raising said body, a main hoist control valve, a pump, an auxiliary ram connected to said linkage means for releasing said partition when said auxiliary ram is expanded and said body is raised, an auxiliary ram control valve, a supply line connecting said pump through said main hoist control valve to said main hoist, a first connecting line connecting said auxiliary ram control valve and said auxiliary ram, a second connecting line connecting said auxiliary ram control valve and said supply line, whereby hydraulic fluid under pressure will be supplied from a cylinder of said main hoist through said supply line and said auxiliary ram control valve to said auxiliary ram when said body is raised and said auxiliary ram control valve is opened to operate said linkage means and release said partition.

2. A dump truck having a partitioned dump truck body and a hydraulic system therefor, said truck and system comprising a gate pivoted laterally on said dump truck body for free swinging movements with respect thereto, projecting means for holding said gate in a predetermined position laterally of said body, linkage means for releasing said gate from said holding means, a main hoist for raising said body, a pump, an auxiliary ram connected to said linkage means for releasing said gate when said auxiliary ram is expanded and said body is raised, an auxiliary ram control valve accessible from a cab of said dump truck, a supply line connecting said pump to said main hoist, connecting line means connecting said main hoist, said auxiliary ram control valve, and said auxiliary ram whereby hydraulic fluid under pressure will be supplied from a cylinder of said main hoist through said supply line, said connecting line means, and said auxiliary ram control valve to said auxiliary ram when said body is raised and said auxiliary ram control valve is opened to operate said linkage means and release said gate to enable it to swing to an open position.

References Cited in the file of this patent
UNITED STATES PATENTS

| | | |
|---|---|---|
| 1,961,193 | Brumbaugh | June 5, 1934 |
| 2,072,998 | Allin | Mar. 9, 1937 |